Patented June 4, 1946

2,401,444

UNITED STATES PATENT OFFICE 2,401,444

REMOVAL OF ACETYLENE FROM GASES

Charles E. Welling, Bartlesville, Okla., assignor to Phillips Petroleum Company, a corporation of Delaware No Drawing. Application January 24, 1942, Serial No. 428,121

5 Claims. (Cl. 260—677)

This invention relates to the removal of acetylene from gases.

When mixtures of hydrocarbons are processed by thermal or catalytic treatment to produce more valuable materials or are treated in some other fashion, it often happens that the presence of even minute quantities of acetylene will give rise to objectionable side reactions or to deposition of carbon. In consequence it is sometimes desirable to treat such mixtures in such a fashion as to remove the acetylene without destroying valuable components of the mixtures.

It is already known that acetylene may be removed from gases containing it by passing the gases over bauxite or over the usual hydrogenation catalysts such as reduced nickel. With gases containing hydrogen and certain unsaturated hydrocarbons, undesirable reactions may occur over these catalysts in addition to the conversion of acetylene. Furthermore, such catalysts may present special problems in manufacture and handling due to lack of mechanical strength, need for supporting the active catalytic material on an inert carrier, difficulty in preparing a catalyst of uniform composition and activity, and the like.

I have found that by leading hydrocarbon gases containing acetylene and hydrogen at elevated temperatures in the range 250 to 360° C. over catalysts of the nature of glasses the acetylene may be very greatly reduced in amount if not completely removed, and this may be accomplished without destroying material quantities of the valuable hydrocarbons present. Said glasses may be of the type known as boro-silicate glasses. Preferred pressures to be utilized in the process would lie in the range 500 to 1500 lbs. per sq. in. It is possible to use the glass catalyst in various forms such as glass wool, chips resulting from crushing or grinding and sizing of the particles, tubes, plates, and the like.

Suitable temperatures for operating my process are in the range 100 to 450° C., and the exact temperature to be used in a particular application of my process will be determined by such factors as flow velocity of the gas over the catalyst and composition of the gas being treated, permissible acetylene content of the treated gas, previous use of the catalyst and the like.

The catalysts according to my invention are relatively immune to sulfur poisoning and in fact minute quantities of sulfur, of the order of a few thousandths of one per cent in the gases to be treated, may render the catalyst more selective in its action upon the acetylene present and hence such amounts of sulfur may be desirable in the form of hydrogen sulfide, mercaptans or the like. The presence of appreciable amounts of sulfur in the gases to be treated may require some increase in the temperature of the catalyst within the range already specified. After a period of use the catalysts according to my invention may lose activity and can be regenerated by burning out in an oxygen-bearing gas stream.

The following example represents a certain specific embodiment of process. Example 1, in which no catalyst was used, is cited merely to show that very little acetylene can be reacted without a catalyst under the conditions of temperature and pressure that are comprehended in my catalytic process. The example is not to be construed as unnecessarily limiting the scope of my invention.

Example 1

A synthetic gas mixture containing about 24 per cent hydrogen, 74 per cent ethylene plus propylene, 0.8% acetylene and small amounts of paraffins was passed through a heated quartz tube. At tube temperatures of 300 to 325° C., a pressure of 735 to 745 lbs. per sq. in., and a space velocity of 90 to 260, from 85 to 91 per cent of the acetylene survived and was found in the effluent gas.

Example 2

A synthetic gas mixture containing about 23.5 per cent hydrogen, 74 per cent propylene plus ethylene, 0.8 per cent acetylene, 0.006 per cent hydrogen sulfide and small amounts of paraffinic constituents was treated at 730 to 740 lbs. per sq. in. pressure and at a catalyst temperature of 300 to 305° C. The catalyst was composed of a "Pyrex" glass tube of about 10 mm. interior diameter which was loosely filled with "Pyrex" glass wool. The catalyst tube was maintained at the temperature indicated above over a length of 32 to 38 inches. The synthetic gas to be treated was passed through the tube at a flow rate of approximately 28 liters gas (at standard conditions) per hour. A sample of effluent gas contained 0.04 to 0.05 per cent acetylene. Concurrent destruction of olefins amounted to two to four per cent of the olefins in the gas treated.

My invention applies particularly to the removal of acetylenes from gases formed by the high-temperature, low-pressure pyrolysis of low-boiling hydrocarbons. In such cases the gases contain sufficient hydrogen for treatment in accordance with my invention, but in the treatment of gases of similar composition but deficient in hydrogen, hydrogen from an outside source may, of course, be added in such amounts as may be found necessary for any particular case. My invention particularly applies to olefin-containing gases where the olefin content exceeds the acetylene content, particularly to gases containing 5% or less of acetylenes, and will find particular use in the treatment of gases containing no more than 1% of acetylenes.

I claim:

1. A process for hydrogenating acetylene in a normally gaseous mixture comprising a minor amount of acetylene together with substantial amounts of free hydrogen and olefins without appreciable hydrogenation of said olefins, which comprises contacting said mixture under superatmospheric pressure and between 100 and 400° C. with a boro-silicate glass for a time sufficient to hydrogenate substantially all of said acetylene, said olefins remaining substantially unreacted.

2. The process of claim 1 in which said mixture contains not more than 5% of acetylene.

3. The process of claim 1 in which said mixture contains not more than 1% of acetylene.

4. The process of claim 1 in which said mixture contains a normally gaseous sulfur-containing compound.

5. A process for removing acetylene from a normally gaseous mixture containing free hydrogen, olefins, and acetylene in an amount less than that of said olefins and not more than 5% of said mixture, which comprises contacting said mixture at a temperature between about 100 and about 400° C. under a pressure between about 500 and about 1500 pounds per square inch with a boro-silicate glass, in a form having a large surface area, for a time such that the effluents are substantially free from acetylene and such that olefins originally present remain substantially unreacted.

CHARLES E. WELLING.